UNITED STATES PATENT OFFICE.

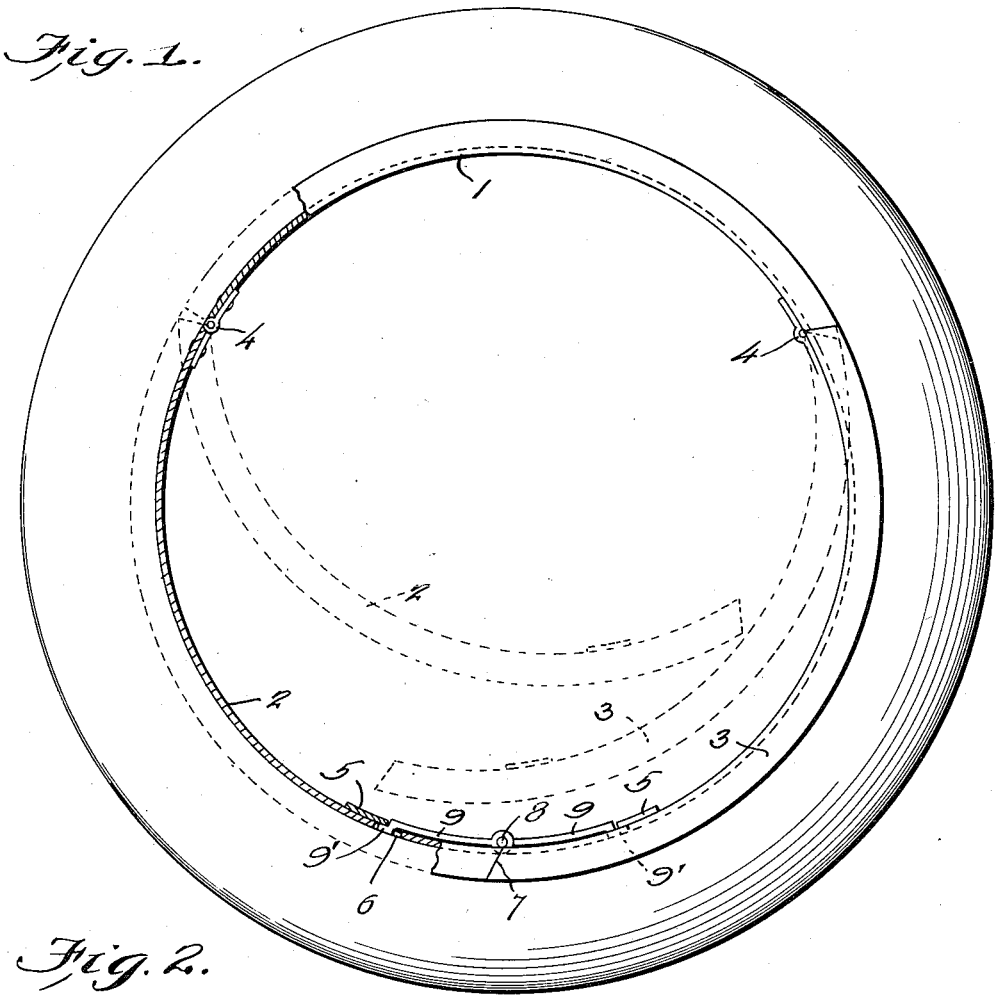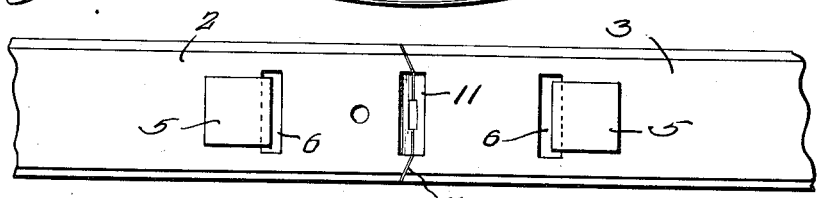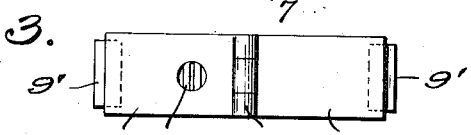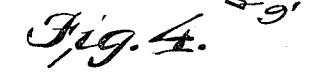

EDWARD C. LUDWICK, OF BASIN, WYOMING, ASSIGNOR OF ONE-THIRD TO CHESTER E. HARRIS AND ONE-THIRD TO FRANK A. WISE, BOTH OF BASIN, WYOMING.

COLLAPSIBLE AUTOMOBILE-RIM.

1,277,090. Specification of Letters Patent. Patented Aug. 27, 1918.

Application filed March 19, 1918. Serial No. 223,448.

*To all whom it may concern:*

Be it known that I, EDWARD C. LUDWICK, a citizen of the United States, residing at Basin, in the county of Bighorn and State of Wyoming, have invented a new and useful Collapsible Automobile-Rim, of which the following is a specification.

The object of this invention is to make possible a quick and easy change of tire. Another object of my invention is to provide a novel adjustable or loose hinge which is used to spread the rim into place when the tire is being mounted on the rim, and which also will lock the rim to the tire.

In the accompanying drawings, illustrating my invention, Figure 1 is a view of the rim applied to a tire, a portion of the rim being shown in section; Fig. 2 is a plan view of the hinge portion of the rim, with the hinge removed; Fig. 3 is a plan view of the hinge detached from the rim; and Fig. 4 is a side elevation of the hinge.

Like numerals designate like parts throughout the views.

Referring to the accompanying drawings I provide a rim formed of three sections, designated 1, 2 and 3, respectively, sections 2 and 3 being pivotally attached to section 1 by hinges 4 of ordinary construction. Spaced a short distance from the adjacent ends of sections 2 and 3 I provide suitable slots 6, over corresponding portions of which suitable stops project, as shown in Figs. 1 and 2.

To secure the rim to the tire I provide a novel adjusting device consisting of the hinge 9 which is provided at each end with an offset extension portion 9'. I provide suitable slotted portions 11 at the adjacent ends of rim sections 2 and 3, to receive the joint 8 of the hinge, which is positioned between the adjacent end 7 of rim sections 2 and 3 when they are mounted to the tire. The hinge is releasably secured to the rim by a suitable fastening member such as screw 10.

When the tire is being mounted on the rim, sections 2 and 3 are placed on the lower portion of the tire and the extended end portions 9' of hinge 9, inserted in slot 6. The hinge joint is then pressed down with the foot, forcing the rim into snug engagement with the tire, and the hinge is secured in place by screw 10. To remove the tire from the rim, the screw 10 is turned with the screw-driver and the hinge can be pried up by inserting screw-driver under the hinge, prying the hinge loose from the rim. When the hinge has been removed the rim sections 2 and 3 may be folded in together as indicated in dotted lines in Fig. 1.

The spring hinge adjuster can be adapted to and would be a valuable lock for any style of split rim, regardless of the additional feature of the two hinge joints 4 which I have provided.

What I claim is:

1. In a collapsible automobile rim, the combination of a plurality of hingedly connected sections, two of the sections having slots near their free ends, stops extending partially over the slots, and a detachable hinge having offset opposite ends shaped to engage in the slots to secure the rim to the tire.

2. In a collapsible automobile rim, the combination of a plurality of hingedly connected sections, two of the sections having slots near their free ends, stops extending partially over the slots, the free ends of the rim sections having adjacent slotted portions, a hinge having offset end portions adapted to engage in the first mentioned slots, the joint of the hinge being adapted to seat in the last mentioned slots, and means for releasably fastening the aforesaid hinge to one of the rim sections to retain the rim in snug engagement with the tire substantially as shown and for the purposes described.

3. A device for adjusting and locking adjacent sections of a split rim, consisting of a removable hinge centrally pivoted and having offset extended end portions adapted to engage in suitable slotted portions near the free ends of the split rim to lock same in alined relation, and a fastening member for securing the aforesaid hinge to the rim and permitting of its convenient detachment therefrom, substantially as described.

EDWARD C. LUDWICK.